United States Patent
Manz et al.

(10) Patent No.: US 9,091,531 B2
(45) Date of Patent: Jul. 28, 2015

(54) METHOD AND DEVICE FOR DETECTING DOUBLE PARTS

(71) Applicant: ROLAND ELECTRONIC GMBH, Keltern-Ellmendingen (DE)

(72) Inventors: Joachim Manz, Stutensee (DE); Friedbert Walch, Remchingen (DE); Matthias Armingeon, Keltern (DE)

(73) Assignee: Roland Electronic GmbH, Keltern-Ellmendingen (DE)

( * ) Notice: Subject to any disclaimer, the term of this patent is extended or adjusted under 35 U.S.C. 154(b) by 95 days.

(21) Appl. No.: 14/022,325

(22) Filed: Sep. 10, 2013

(65) Prior Publication Data

US 2014/0078520 A1    Mar. 20, 2014

(30) Foreign Application Priority Data

Sep. 17, 2012 (EP) .................................... 12401188

(51) Int. Cl.
| | |
|---|---|
| *G01B 11/06* | (2006.01) |
| *B65H 7/04* | (2006.01) |
| *B65H 7/12* | (2006.01) |

(52) U.S. Cl.
CPC .............. *G01B 11/0691* (2013.01); *B65H 7/04* (2013.01); *B65H 7/125* (2013.01); *B65H 2511/13* (2013.01); *B65H 2511/22* (2013.01); *B65H 2511/51* (2013.01); *B65H 2511/524* (2013.01); *B65H 2515/60* (2013.01); *B65H 2553/412* (2013.01)

(58) Field of Classification Search
USPC .................. 356/614, 625, 630, 631, 399–401, 356/429–430; 250/559.01, 559.27
See application file for complete search history.

(56) References Cited

U.S. PATENT DOCUMENTS

| | | | | |
|---|---|---|---|---|
| 5,210,593 | A * | 5/1993 | Kramer | 356/631 |
| 5,581,353 | A * | 12/1996 | Taylor | 356/631 |
| 5,841,540 | A | 11/1998 | Mondie | |
| 6,038,028 | A * | 3/2000 | Grann et al. | 356/630 |
| 6,281,679 | B1 * | 8/2001 | King et al. | 324/229 |
| 6,757,069 | B2 * | 6/2004 | Bowles | 356/630 |
| 6,967,726 | B2 * | 11/2005 | King et al. | 356/630 |

(Continued)

FOREIGN PATENT DOCUMENTS

| | | |
|---|---|---|
| DE | 39 01 088 A1 | 7/1990 |
| EP | 1 510 484 A1 | 3/2005 |
| JP | 02-134505 A | 5/1990 |

(Continued)

OTHER PUBLICATIONS

European Search Report for corresponding European Application No. EP 12 40 1188 dated Feb. 25, 2013.

*Primary Examiner* — Sang Nguyen
(74) *Attorney, Agent, or Firm* — Renner, Otto, Boisselle & Sklar, LLP

(57) ABSTRACT

The invention relates to the positioning of an additional photo receiver in addition to the known laser sensors for detecting double parts during transport and during the loading of machines, which are situated opposite each other. The additional photo receiver receives the laser beam from a laser sensor located opposite, exactly when there is no material in the measuring gap and the two laser sensors are precisely aligned. This arrangement makes it possible to improve the measuring process and the analysis of the measurement, and thereby increases process reliability during the monitoring of transport and the loading of machines.

13 Claims, 1 Drawing Sheet

(56) References Cited

U.S. PATENT DOCUMENTS

| | | | |
|---|---|---|---|
| 7,319,521 B2 * | 1/2008 | Typpoe et al. | 356/430 |
| 2007/0145307 A1 * | 6/2007 | Duck et al. | 250/559.01 |

FOREIGN PATENT DOCUMENTS

| | | |
|---|---|---|
| JP | 03-118405 A | 5/1991 |
| JP | 06-235624 A | 8/1994 |
| JP | 07-077411 A | 3/1995 |
| JP | 09-196642 A | 7/1997 |
| JP | 11-038123 A | 2/1999 |
| JP | 2002-533661 A | 10/2002 |
| JP | 2003-012188 A | 1/2003 |
| JP | 2004-005538 A | 1/2004 |
| JP | 2009-222428 A | 10/2009 |
| WO | WO 2009/139189 A1 | 11/2009 |

* cited by examiner

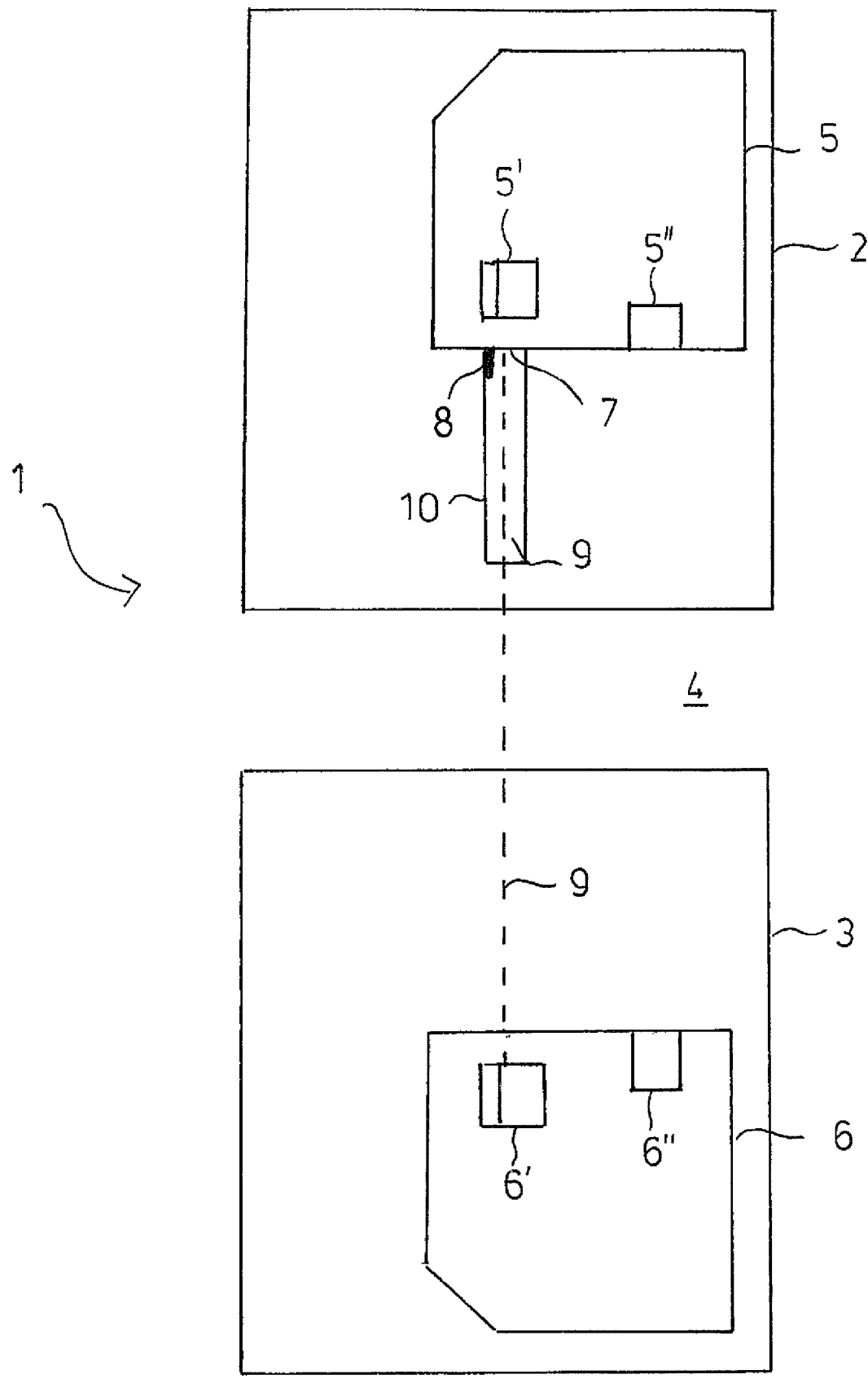

METHOD AND DEVICE FOR DETECTING DOUBLE PARTS

CROSS-REFERENCE TO RELATED APPLICATION

The present application claims priority under 35 USC §119 to European Patent Application No. 12 401 188.3, filed Sep. 17, 2012, the entire disclosure of which is incorporated herein by reference.

TECHNICAL FIELD OF THE INVENTION

The present invention relates to a method for detecting double parts during transport and during the loading of machines by means of two laser sensors situated opposite each other, each having a laser source and a detector between which the parts pass, wherein the distances between the respective laser sensor and the surface of the part facing it are measured and the thickness of the part is ascertained from the difference between the distance of the laser sensors from each other and the sum of the distances measured by the two laser sensors. The invention also relates to a device for detecting double parts during transport and during the loading of machines, having two laser sensor units situated opposite each other which, situated at a distance from each other, form a measuring gap for the parts that are moved through between them, each having a laser sensor, each provided with a laser source and a detector, and an electronic control unit connected to or connectible to the laser sensor units.

DESCRIPTION OF THE RELATED ART

A method and a device for detecting double parts are known from DE 39 01 088 A1. This method makes it possible to scan parts passing through, independent of the material and the surface character of the parts. It is possible to monitor sheet metal panels, metal sheets, rolls, sheet metal blanks, front panels, etc., which are made of ferromagnetic or non-ferromagnetic material, for example steel, aluminum, brass, zinc, copper and other metal alloys. Parts made of plastic, cardboard and the like can likewise be monitored.

The essential concern is to determine that in fact only one part is being fed into the machine. A variety of methods have become established in particular for detection of double sheets when feeding metal sheets into forming presses. Process reliability is a feature to which the very highest importance is attached here. Therefore, not every measuring principle is suitable for this demanding task. An advantage of using laser sensors is that a relatively small measuring range is needed when checking sheet metal panels, compared to the likewise contact-free eddy current method.

In present-day laser applications, for the purpose of measuring thicknesses two laser sensors are installed in such a way that they are located opposite each other and the distances are ascertained as indicated earlier. This type of assembly and analysis is only successful in practice if care is taken to ensure that the two lasers are exactly aligned with each other, the axis of measurement is perpendicular to the surface, the distances are measured and analyzed synchronously, the assembly distance is kept constant, fast laser sensors are used which can adjust quickly to changed reflective properties, and if the measuring system is monitored without interruption.

Exact alignment of the two lasers with each other is absolutely necessary, because only then is it possible to measure with sufficient precision, since even when the lasers are aligned perpendicular to the part being measured, when they are not aligned exactly with each other, i.e., with an offset, an unevenness in the material which is present with the one sensor and not with the other is enough to result in measurement errors. If the axis of measurement is not aligned perpendicular to the surface of the material, the thickness is not measured, but rather a distance which corresponds to the actual distance divided by the cosine of the angle by which the surface of the material deviates from a right angle. Temporal measurement errors can occur if the two distances are not measured simultaneously and the two measurements are not analyzed as a pair, simultaneous measurement here meaning synchronous scanning of the distances. These measurement errors only appear if the material vibrates or is uneven. Distances are then measured erroneously, although it is possible for the system to work for a long time without appreciable measurement errors, and then it can suddenly become conspicuous because the material tends to vibrate more at that instant than before.

Thus it is important to provide uninterrupted detection of a fault, in order to prevent erroneous analyses. Known laser sensors exhibit an intrinsic weakness here, which does not become evident until the laser beam fails. This can result in the material being able to pass through the measuring gap unnoticed. This is especially serious, because at that time the process of checking for double sheets is practically no longer reliable.

SUMMARY OF THE INVENTION

The object of the present invention is therefore to propose a possibility which increases process reliability in detecting double parts.

This object is fulfilled according to the invention as described herein.

According to the invention, the relevant laser beam is detected by means of a photo receiver situated opposite one of the two laser sources, and thus the detection process is monitored by the laser sensors. This results in the process reliability in the checking of double parts being significantly improved. By means of this measure, speculations about the current location of the material are avoided, and possible false positions of the laser sources or laser sensors are detected.

Preferably, it is determined by means of the photo receiver whether a part is located between the laser sensors. This additional measure in addition to the existing measurement data from the laser sensors is particularly important in order to detect the condition "no material" between the laser sensors.

Advantageously, if there is no part between the laser sensors, the alignment of the two laser sensors relative to each other is checked, in that the photo receiver only receives a signal from the laser source positioned opposite when the two laser sources or laser sensors are exactly aligned.

According to another embodiment of the method, said two measures named above result in a measurement of parts only being performed if the laser beam from the one laser source situated opposite it is received by the photo receiver prior to the measurement of the distances by the laser sensors. In addition, according to a refinement, the measurement can also only be performed if a measurement signal referring to the distance from a part is emitted by both laser sensors. Thereby at least a more exact statement about the process monitoring is possible than before, when an invalid distance value was interpreted as "no material in the measuring gap."

Furthermore, according to a preferred embodiment of the method, a fault indication may be issued after a measurement of the distances by the laser sensors, if no laser beam from the one laser source located opposite is received by the photo receiver. This would mean that the alignment of the laser sensors has changed during the measurement, and that the prior measurement is in part at least questionable.

In another embodiment of the method, the other laser source can advantageously be switched off briefly when the photo receiver receives a laser beam from the laser source located opposite the photo receiver. This is intended to prevent possible scattered light from the other laser source from landing on the photo receiver and being interpreted by the latter as a signal from the laser source located opposite. Expediently, the method is designed so that the measurement of the distances is started at the parts, when a part is moved in the laser beam detected by the photo receiver; that is, the photo receiver receives no light from the laser source located opposite. That establishes a clear beginning of the measurement.

The device according to the invention has a photo receiver which receives the laser beam from the laser source of a laser sensor unit situated opposite, when the measuring gap is free and the laser sensor units are aligned with each other for an exact measurement.

Preferably, a valid measurement area for the measurement, which is expedient for the analysis, is established by the measuring gap defined by the laser sensor units. Advantageously, the control unit emits a fault indication if the photo receiver receives no signal from the laser source situated opposite and one or both laser sensor units emit no signal. In this case it is clear that there is material between the laser sensor units, yet the laser sensor units do not deliver the accordingly expected signals. Ideally, the alignment could be such that the two laser sensor units essentially must always deliver the same signals. If deviations occur here within a certain tolerance range, that means an unevenness of the material, outside of the tolerance range an error.

In principle, the photo receiver may be integrated into the laser source as well or situated externally. Advantageously, the photo receiver is situated so that the scattered light comes from the laser beam striking a glass covering of the first laser source. Here the arrangement of the photo receiver is realized by a simple design measure. The glass plate which is usually present at the laser source anyway, through which the laser beam of the laser source emerges, is used to capture the reflection of the laser beam which strikes this glass plate from the laser source situated opposite. The dimensioning in this case is in a small range, such that when reflections are received by the photo receiver it can be assumed that the two laser sources are exactly aligned.

In order to prevent the photo receiver from receiving scattered light of any sort, which can result in erroneous interpretations, an optical shielding element is provided which prevents ambient light from striking the photo receiver. This can be realized by suitable optical elements, for example filters. It is also possible to simply use for this purpose a shell which is dark on the inside, in which the photo receiver is situated and through which the laser beam reaches the glass plate.

The invention thus makes possible a more process-reliable monitoring of double parts by means of an additional design measure on existing units and the corresponding execution of a measurement method. The advantage lies in the fact that it is possible to determine unambiguously when there is no material in the measuring gap and the alignment of the two sensors is checked.

BRIEF DESCRIPTION OF THE DRAWINGS

Additional features of the invention derive from the following description of an exemplary embodiment of the invention, in combination with the claims and the drawing. The individual features can be realized individually or in groups for embodiments of the invention. In the single FIGURE, the arrangement of the laser sensor units without material between laser sensor units is depicted in a sectional view in principle. The FIGURE shows a device 1 having a first laser sensor unit 2 and a second laser sensor unit 3. Between the laser sensor units 2, 3 the measuring gap 4 is formed. Each laser sensor unit 2, 3 has a laser sensor 5 or 6, each of which contains a laser source 5', 6' and a detector 5", 6" in a known manner for measuring intervals. The signals delivered by the laser detectors are analyzed by means of a control unit (not shown). On the laser sensor 5 is a shell 10 for protection from extraneous light, which has a photo receiver 8 on its inner side at its end near the exit window 7 of the laser sensor 5. The photo receiver 8 may be a normal photo diode. The latter detects the light reflected back from the exit window 7 as scattered light from a laser beam 9, which comes from the laser source 6' situated in the laser sensor 6. The signal delivered by the photo diode 8 is likewise fed to the electric control unit 8 (not shown) for analysis.

DETAILED DESCRIPTION OF THE INVENTION

As soon as the laser beam 9 of the laser source 6' is captured by the photo receiver 8, it is confirmed that there is no material in the measuring gap. This state is thus unambiguous. For reliability, the laser 5 can be briefly deactivated. That ensures that the photo receiver 8 does not accidentally receive light of the laser beam from the laser sensor 5 during the checking so that the measuring gap 4 is accidentally interpreted as free.

One possible sequence of the method is such that after it has been detected that there is material between the sensors 2, 3, a measurement is performed and it is determined whether the signals delivered via laser sensors 5, 6 are valid. If that is the case, the measuring is continued. If it turns out that they are both non-valid, for example because they exceed or fall below limiting values, the laser sensor 5 is briefly turned off. If there is a signal present at the photo receiver 8, this means that there is no material present and a next measurement can begin. If no signal is present, a fault is issued. A fault is also issued during the measurement if a signal from laser sensor 5 or laser 6 is non-valid.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

The invention claimed is:

1. A method for detecting double parts during transport of parts and during the loading of machines with parts using a device comprising a first laser sensor unit and a second laser sensor unit, the first laser sensor unit comprising a first laser source, a first laser detector, and a photo receiver, and the second laser sensor unit comprising a second laser source and a second laser detector, wherein the first laser sensor unit is situated opposite the second laser sensor unit and at a first distance from the second laser sensor unit, thereby forming a measuring gap and the photo receiver is situated opposite the second laser sources and configured to detect a laser beam from the second laser source, the method comprising the steps of:

passing a part through the measuring gap between the first and second laser sensor units, measuring a second distance from a surface of the part facing the first laser sensor unit to the first laser sensor unit, measuring a third distance from a surface of the part facing the second laser sensor unit to the second laser sensor unit, calculating a thickness of the part from the difference between the first distance and the sum of the second and third distances, and monitoring the measuring gap and the first and second laser sensing units using the photo receiver.

2. The method according to claim 1, wherein the monitoring step further comprises determining whether there is no part located in the measuring gap between the first and second laser sensor units.

3. The method according to claim 1, wherein the method further comprises the step of determining if there is no part located in the measuring gap between the first and second laser sensor units and checking the alignment of the first and second laser sensor units relative to each other if there is no part in the measuring gap.

4. The method according to claim 1, wherein the method further comprises the step of receiving a laser beam from the second laser source using the photo receiver and the measuring steps are only performed after the laser beam from the second laser source is received by the photo receiver.

5. The method according to claim 4, wherein the calculating step is only performed if the second and third distances are measured.

6. The method according to claim 4, wherein the method further comprises issuing a fault indication if a laser beam from the second laser source is not received by the photo receiver.

7. The method according to claim 4, wherein the method further comprises the step of briefly switching off the first laser source if the photo receiver detects a laser beam from the second laser source.

8. The method according to claim 4, wherein the measuring steps are performed after a part is moved into the laser beam detected by the photo receiver.

9. A device for detecting double parts during transport of parts and during the loading of machines with parts, the device comprising a first laser sensor unit comprising a first laser source, a first laser detector, and a photo receiver, a second laser sensor unit comprising a second laser source and a second laser detector, and an electronic control unit configured to be connected to the first and second laser sensor units, wherein the first and second laser sensor units are situated opposite each other and at a distance from each other, wherein the first and second laser sensor units form a measuring gap through which parts may be moved between the first and second laser sensor units, wherein the first and second laser sensor units are aligned with each other for an exact measurement of the thickness of a part moving through the measuring gap, wherein the first laser sensor unit is configured to measure the distance from a surface of a part moving through the measuring gap to the first laser sensor unit, wherein the second laser sensor unit is configured to measure the distance from a surface of a part moving through the measuring gap to the second laser sensor unit, wherein the photo receiver is configured to receive light from a laser beam from the second laser source there is no part in the measuring gap.

10. The device according to claim 9, wherein the measuring gap establishes a valid measurement area for the measurement.

11. The device according to claim 9, wherein the control unit is configured to outputs a fault indication if the photo receiver does not receive the laser beam from the second laser source and one or both laser sensor units is unable to measure the distance from a surface of a part moving through the measuring gap to the laser sensor unit.

12. The device according to claim 9, wherein the first laser sensor unit comprises a glass covering over the first laser source, and wherein the photo receiver is configured to receive light from the laser beam from the second laser source that is scattered by striking the glass covering.

13. The device according to claim 9, wherein the first laser sensor unit further comprises an optical shielding element configured to prevent ambient light from striking the photo receiver.

* * * * *